D. & H. WOLF.
Seed Planter.
No. 8,132. Patented June 3, 1851.
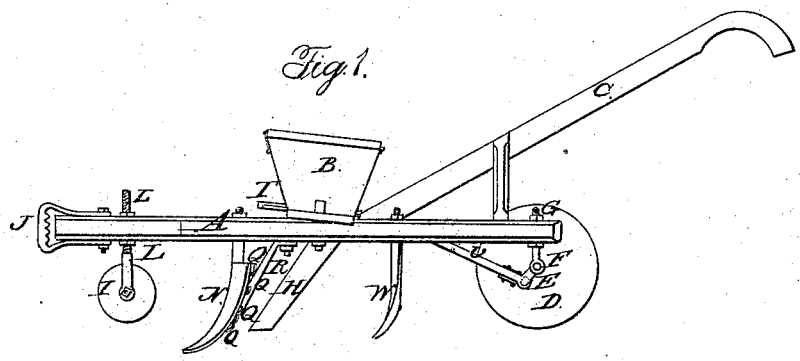
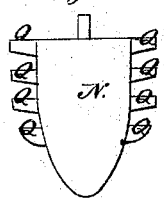
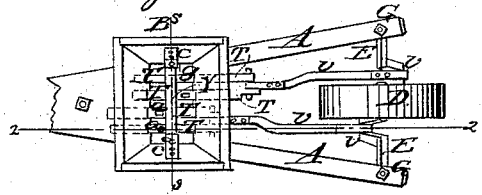
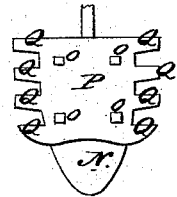
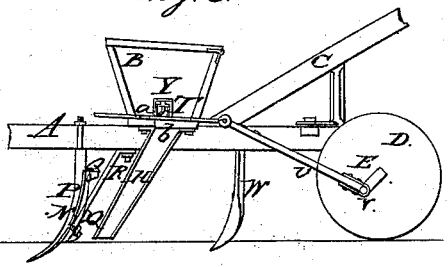
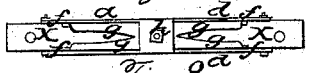
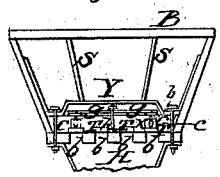
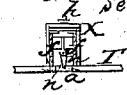

UNITED STATES PATENT OFFICE.

D. WOLF AND H. WOLF, OF LEBANON, PENNSYLVANIA.

IMPROVEMENT IN SEED-DISTRIBUTERS OF SEED-PLANTERS.

Specification forming part of Letters Patent No. 8,132, dated June 3, 1851.

*To all whom it may concern:*

Be it known that we, DAVID WOLF and HERMAN WOLF, of Lebanon, in the county of Lebanon and State of Pennsylvania, have invented certain new and useful Improvements on the Machine for Planting Corn and other Seed Intermixed with Manure; and we do hereby declare the following to be a full and clear description of the construction and operation thereof, reference being had to the annexed drawings of the same, making part of this specification.

Figure 1 represents an elevation of the side of the machine. Fig. 2 is a plan of a section of the same. Fig. 3 is a vertical section through the hopper, &c., on the dotted line 2 2 of Fig. 2. Fig. 4 is a vertical section of the same on the dotted line 3 3 of Fig. 2. Fig. 5 is a front view of the shovel-plow, showing the fingers or arms projecting horizontally from its edges. Fig. 6 is a view of the rear side of the same. Fig. 7 is a top view of the notched bar of the hopper, showing the springs which press upon the vertical strikers or guard-plates of the reciprocating slide-bars. Fig. 8 is a side view of the notched bar, showing one of the notched plates, &c. Fig. 9 is a transverse section of the notched bar, showing one of the jointed clearers.

Where the same letters of reference occur on the several figures they indicate the same parts.

A is the frame.

B is the hopper within which the seed and manure are placed. C are the handles.

D is the sustaining-roller wheel, fixed on a transverse crank-shaft, E, at the rear part of the frame A, having its bearings in boxes F on the lower ends of screw-rods G G, passed through the beams, and provided with nuts for adjusting the sustaining-roller wheel D to any desired height and effectually cover the seed in passing over the furrow, and which, in connection with a regulating-roller, I, support the frame.

I is the regulating-roller, having its bearings in the ends of two arms, from which projects through the front portion of the frame a screw-rod, L, provided with nuts for adjusting the same to regulate the depth of the furrow according to the character of the soil.

N is the shovel-plow, secured to the frame in the usual manner in front of the hopper. To the rear side of this shovel-plow is secured, by means of screw-bolts O, a plate, P, extending from the top of the shovel-plow N to near the bottom thereof, and having projecting horizontally from its edges a series of arms, Q, at suitable distances apart for the purpose of removing the stones, clods of earth, and other obstructions from the furrow, and leaving the finer broken soil to cover the seed.

R is a brace-bar bolted to the rear side of the shovel-plow N, and to the under side of the frame.

The hopper B is divided into three apartments by division-boards S S, the central apartment being for the reception of manures and the two side apartments for the reception of the seed.

T T are the horizontal reciprocating slide-bars placed parallel to each other at the bottom of the hopper B, and provided with openings or apertures a, through which the seed and manure are discharged. These horizontal reciprocating slide-bars T project through the hopper, and are connected at their rear ends, in pairs, to the ends of two connecting-bars, U U, which extend on either side of the sustaining roller-wheel D, and connect with two cranks, V V, which quarter each other on the shaft E for imparting to the horizontal slide-bars T, in pairs, a reciprocating movement during the progress of the machine, there being one slide-bar T to each seed apartment and two slide-bars to the manure-apartment, and moving reciprocally in pairs by the rotation of the crank-shaft E, as shown in Fig. 2.

The bottom board of the hopper is provided with openings b, or apertures corresponding with those, a, in the reciprocating slide-bars T, through which the seed and manure are discharged into a conducting-spout, H, attached to the under side of the frame and inclining downward and frontward, through which the seed and manure are conducted directly into the furrow.

W W are cultivator-blades projecting from either side of the frame, between the sustaining-roller wheel D and conducting-spout H, for covering the seed as it is discharged.

In the center of the hopper B there is secured, by screw-bolts c c, a transverse bar, X, notched on its under side to receive and permit the slide-bars T to move back and forth. On either side of the transverse bar X are secured plates $dd$, having notches $e$ corresponding with those in the transverse bar X.

Between the plates $d$ and sides of the transverse bar X are confined short guard or striking plates $ff$, adjacent to the notches within which the slide-bars of the seed-apartments move, on whose upper ends are made to press springs $gg$, which are secured on the upper side of the transverse bar by a screw-bolt, $h$, for the purpose of allowing said guard-plates $f$ to rise when more than one grain of corn shall pass into the apertures $a$ of the slide-bars T as they move beneath the transverse bar, and thus prevent the grain from being cut or broken, and also serve the purpose of strikers to the slide-bars, the notches in the plates $d$ being larger than is necessary to allow the passage of the grain, but are closed by the lower ends of the guard-plates $f$, as seen in Fig. 8. Thus it will be seen that the openings or notches $e$ in the plates $d$ of the transverse bar X are only enlarged when more than one grain of corn shall at a time pass with the motion of the slide-bars through the same, the descent of the vertical guard-plates $f$, when elevated, being effected by the pressure of the ends of the springs $g$, and governed by shoulders $ii$, as seen in Fig. 8.

The notches in the transverse bar, into which the grain passes, are excavated, as seen in Fig. 9, to receive jointed clearers $n$, which are secured in the transverse bar X and made to project into the apertures $a$ of the slide-bars T as they pass beneath the transverse bar, so that when said apertures $a$ shall have a tendency to choke the point of the jointed clearer $n$ will strike the grain and press it down as it (the clearer) moves back and forth in the aperture $a$ during the movement of the slide-bar, and thus effectually prevent the apertures of the slide-bars from choking during the operation of the machine.

Y is a box or cover placed over the springs $g$ and transverse bar X for the purpose of preventing the contact of the manure and grain therewith, which would interrupt the proper action of the vertical guard-plates $f$ and springs.

The hopper is secured to the frame by the same screw-bolts $c$ that secure the horizontal transverse bar, as seen in Fig. 4.

The manure and grain are discharged simultaneously into the conducting-spout H, and may be regulated at pleasure by disengaging one of the connecting-rods of the crank-shaft E from the ends of a pair of reciprocating slide-bars, T.

Having thus described our improvements on the machine for planting corn and other grain, what we claim therein as new, and desire to secure by Letters Patent, is—

In combination with the notched transverse bar X, the employment of the jointed clearers $n$, projecting from the recesses of said bar X into the apertures $a$ of slide-bars T for preventing the choking of the apertures.

In testimony whereof we have hereunto signed our names before two subscribing witnesses.

DAVID WOLF.
HERMAN WOLF.

Witnesses:
J. C. GOODHART,
JOEL GOODHART.